United States Patent
Willey

(10) Patent No.: US 9,169,054 B2
(45) Date of Patent: Oct. 27, 2015

(54) LAMINATED MATERIAL AND METHOD OF PRODUCTION THEREOF

(75) Inventor: Jason Willey, Barry (GB)

(73) Assignee: Intercontinental Great Brands LLC, East Hanover, NJ (US)

(*) Notice: Subject to any disclaimer, the term of this patent is extended or adjusted under 35 U.S.C. 154(b) by 522 days.

(21) Appl. No.: 13/377,932

(22) PCT Filed: Jun. 17, 2010

(86) PCT No.: PCT/GB2010/051002
§ 371 (c)(1),
(2), (4) Date: Mar. 1, 2012

(87) PCT Pub. No.: WO2010/149996
PCT Pub. Date: Dec. 29, 2010

(65) Prior Publication Data
US 2012/0156437 A1   Jun. 21, 2012

(30) Foreign Application Priority Data
Jun. 25, 2009   (GB) .................................. 0911001.6

(51) Int. Cl.
*B32B 3/24* (2006.01)
*B32B 7/12* (2006.01)
(Continued)

(52) U.S. Cl.
CPC ............ *B65D 75/5833* (2013.01); *B32B 3/266* (2013.01); *B32B 7/12* (2013.01); *B32B 15/08* (2013.01); *B32B 27/18* (2013.01); *B32B 38/04* (2013.01); *B23K 26/365* (2013.01); *B23K 26/409* (2013.01); *B29C 59/007* (2013.01); *B29C 59/16* (2013.01); *B29C 2791/009* (2013.01); *B29L 2009/003* (2013.01); *B32B 37/12* (2013.01);
(Continued)

(58) Field of Classification Search
None
See application file for complete search history.

(56) References Cited

U.S. PATENT DOCUMENTS 3,790,744 A * 2/1974 Bowen .................... 219/121.69
5,010,231 A * 4/1991 Huizinga ................. 219/121.69
(Continued)

FOREIGN PATENT DOCUMENTS

EP        1 449 789 A1    8/2004
WO        02/068192 A1    9/2002

OTHER PUBLICATIONS

NewPage, General Characteristics of Metallic Inks, Aug. 2008, Edition #1 Metallics <https://edliveshere.com/content/metallics/4/general_characteristics_of_metallic_inks/>.*

Primary Examiner — Jeff Vonch
(74) Attorney, Agent, or Firm — Hoffmann & Baron, LLP

(57) ABSTRACT

A flexible laminated packaging material (100) comprises a plurality of layers, at least two of which are bonded together by a layer of adhesive (108). A first layer (113) comprises a continuous metallic foil (110) and a second layer (111) comprises a continuous web of material incorporating or coated with a laser retardant additive (106). The material may be scored or cut with a laser (114, 118) so as to produce offset scores or cuts (122, 124) wherein a first cut (124) is made through the first layer (113), but not past the second layer (111) and a second cut (122) is made through the second layer (111), but not past the first layer (113). The laser retardant additive (106) attenuates the power of the laser to help control the depth of the cuts. A method of producing the material by laminating the first and second layers using an adhesive is also disclosed. The method may comprise applying a laser beam to the first web so as to score or cut the first web, but not the second web; and applying a laser beam to the second web so as to score of cut the second web, but not the first web.

17 Claims, 4 Drawing Sheets

(51) Int. Cl.
    *B32B 15/06*    (2006.01)
    *B32B 37/12*    (2006.01)
    *B32B 38/04*    (2006.01)
    *B65D 65/28*    (2006.01)
    *B65D 65/30*    (2006.01)
    *B65D 65/40*    (2006.01)
    *B65D 75/62*    (2006.01)
    *B29C 59/16*    (2006.01)
    *B23K 26/38*    (2014.01)
    *B23K 26/40*    (2014.01)
    *B65D 75/58*    (2006.01)
    *B32B 3/26*     (2006.01)
    *B32B 15/08*    (2006.01)
    *B32B 27/18*    (2006.01)
    *B23K 26/36*    (2014.01)
    *B29C 59/00*    (2006.01)
    *B29L 9/00*     (2006.01)

(52) U.S. Cl.
    CPC ..... *B32B 2310/0843* (2013.01); *B32B 2439/00* (2013.01); *B32B 2439/06* (2013.01); *B32B 2439/46* (2013.01); *B32B 2439/70* (2013.01); *B65D 2575/586* (2013.01); *Y10T 156/1052* (2015.01); *Y10T 428/24612* (2015.01)

(56) References Cited

U.S. PATENT DOCUMENTS

| | | | | |
|---|---|---|---|---|
| 5,158,499 | A * | 10/1992 | Guckenberger | 206/524.2 |
| 5,229,180 | A * | 7/1993 | Littmann | 428/43 |
| 5,549,774 | A * | 8/1996 | Miekka et al. | 156/209 |
| 2005/0276525 | A1* | 12/2005 | Hebert et al. | 383/203 |
| 2005/0284789 | A1* | 12/2005 | Carespodi | 206/461 |
| 2007/0104917 | A1* | 5/2007 | Krug et al. | 428/43 |
| 2007/0292664 | A1* | 12/2007 | Wustner | 428/195.1 |
| 2009/0226117 | A1* | 9/2009 | Davis et al. | 383/5 |
| 2010/0113239 | A1* | 5/2010 | Peterson | 493/187 |
| 2010/0113241 | A1* | 5/2010 | Hebert et al. | 493/213 |
| 2010/0278454 | A1* | 11/2010 | Huffer | 383/5 |
| 2011/0266189 | A1* | 11/2011 | Tom et al. | 206/531 |

* cited by examiner

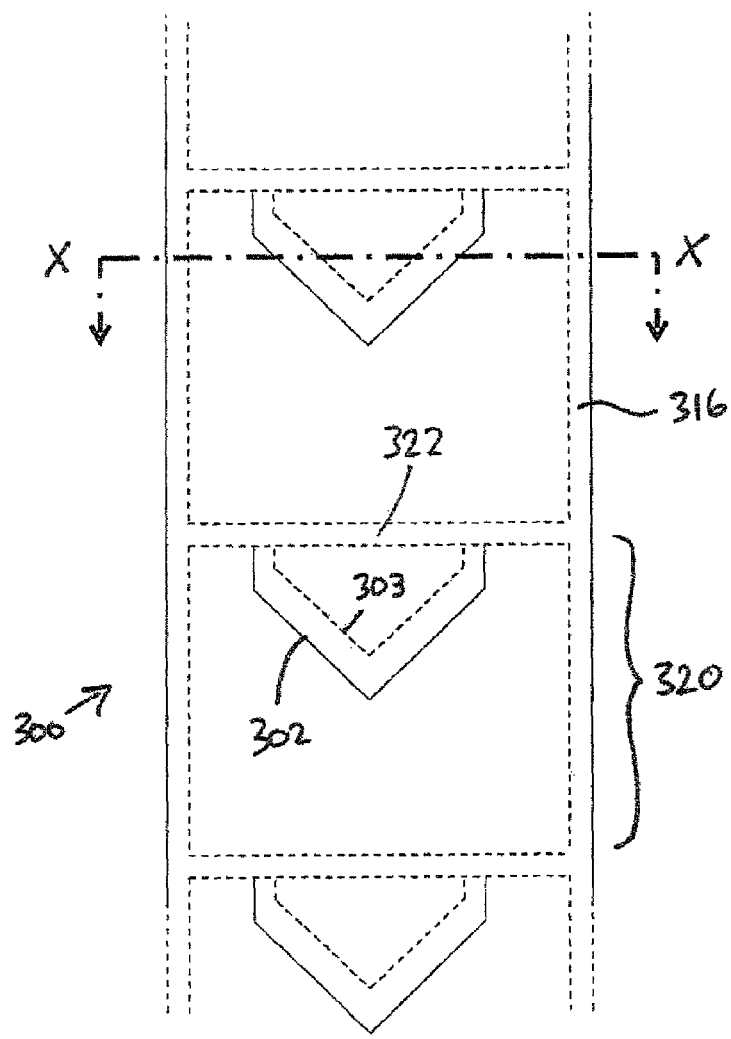
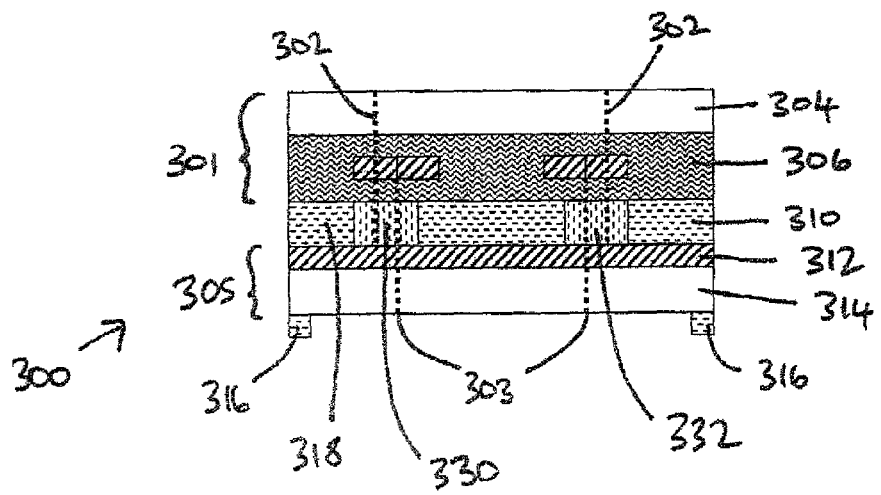

LAMINATED MATERIAL AND METHOD OF PRODUCTION THEREOF

CROSS-REFERENCE TO RELATED APPLICATIONS

This application is the National Stage of International Application No. PCT/GB2010/051002, which designates the U.S., filed Jun. 17, 2010, which claims the benefit of Great Britain Application No. GB 0911001.6 filed Jun. 25, 2009, the contents of which are incorporated by reference herein.

TECHNICAL FIELD OF THE INVENTION

The present invention relates to a laminated material, and in particular to a flexible laminated material for use in packaging which incorporates an integrally formed resealable flap.

BACKGROUND TO THE INVENTION

It is known to package products, including food products, in a wrapper that is fabricated from a substantially gas and moisture impervious material, such as a metal foil, or a plastics material (including a laminate of either or both materials), in order to protect the product.

Such known wrappers may be formed from a length of flat, foldable material having an inner surface directed to the product and an outer surface. The outer surface may be printed on or otherwise be provided with information for the consumer. The material is folded about the product and the longitudinal side edges are bonded together to form a longitudinal sealed seam, sometimes referred to as a "fin seal" or "fin seam". The material extends beyond the ends of the product and opposing edge regions at either end of the wrapper are bonded together to form transverse end seams. The seams may be formed using an adhesive to bond the opposing surfaces of the wrapper or by heating the material under pressure so that the opposing surfaces melt and fuse together to form a welded seam.

Packaging of this nature can be produced using a flow-wrap method in which a film of material is supplied in a roll to package a number of products in a substantially continuous process. The material is fed through a machine which folds it about each product in turn so that opposing side edges are brought into contact and bonded together to form the longitudinal seam, which usually extends along a rear face of the product. The material is crimped at either end of the product to form the end seams and the material is cut to separate each package from the remainder of the film.

FIG. 1 shows a commonly used laminated film 10 used in a flow-wrap method. The laminated film comprises an outer surface 11 formed of a clear oriented polypropylene (OPP) 12, to which an image formed from a layer of ink 14 is reverse printed. The reverse printed OPP 12 is adhered, by means of an adhesive 16 to a metallic foil layer 18—this foil layer providing the material with a reflective metallic coloured finish. The metallic foil layer in turn has been applied to a substrate of white OPP 20 by means of vacuum or vapour deposition. The non-metallic coated surface of the white OPP 20 forms the inner surface 13 of the laminated material. Once formed, the laminated material 10 can be made into the packaging and sealed at the edges with a permanent adhesive.

A number of laminated packaging materials incorporating resealable flaps are known in the art. For example, EP1449789 discloses a packaging container comprising a packing film which is formed from a laminated material incorporating perforations or cut lines on the outer and inner surfaces of the laminated film which may be produced by means of mechanical knives or lasers.

FIG. 2A shows a known laminated film 50 which includes a resealable flap, where the outer and inner surfaces (these surfaces being generally denoted 52 & 54 respectively) are cut in an offset manner by means of lasers. Briefly, the laminated film in FIG. 2A comprises a layer of white OPP 56, to which is applied an image formed a layer of ink 58. Overlaying the layer of ink 58 is a layer of clear varnish 60 to protect the image during handling of the laminated film. To the underside of the white OPP 56, an upper metallic foil layer 62 has been applied by means of vacuum or vapour deposition. The upper metallic foil layer 62 is adhered to a lower foil layer 64 by means of a layer of resealable adhesive 66. The lower foil layer has in turn been deposited on a further layer of white OPP 68. Lasers 70 and 72 located above and below the laminate 50 can make offset score lines in the upper 52 and lower 54 portions of the laminate so that a resealable flap can be produced (as illustrated in FIG. 2B). Generally speaking, the foil layers 62 and 64 are intended to be cut and also prevent the lasers from passing any further in the material during the cutting step. However, in practice, each of the foil layers tends to only attenuate the cutting power of the laser and the following foil layer actually stops the laser from penetrating the laminate any further. This is schematically shown in FIG. 2A by the path of the laser penetrating the laminate up to the first foil layer it encounters with a solid line and thereafter a dotted line after is has been attenuated and that the second foil layer actually prevents any further penetration. FIG. 2B shows the laminate after being cut by the laser and has an upper cut 74 extending from the varnish 60 to the lower metallic foil layer 64 and a lower cut 76 extending from the further layer of white OPP 68 to the upper metallic foil layer 62. Unfortunately, the laminate material illustrated in FIGS. 2A and 2B is quite thick resulting in handling and wrapping problems and having more than one foil layer greatly increases the cost of the material.

It is an object of the present invention to overcome one or more problems associated with the prior art laminated materials. It is also an object to produce an inexpensive laminated material having offset cuts above and below the material which can be produced using a laser. A further object of the present invention is to provide a laminated material which can be reverse printed to improve quality of the finished product and overcome the requirement of a surface varnish.

SUMMARY OF THE INVENTION

In accordance with one embodiment of the present invention, there is provided a flexible laminated packaging material comprising a plurality of layers, at least two of which are bonded together by a layer of adhesive, a first layer comprising a continuous metallic foil and a second layer comprising a continuous web of material incorporating or coated with a laser retardant additive having laser retarding properties, the material having offset scores or cuts wherein a first score or cut extends through the first layer, but not past the second layer and a second score or cut extends through the second layer, but not past the first layer.

The term "retardant additive" should be taken to mean any material which is capable of hindering, attenuating or mitigating the passage of electromagnetic radiation in the spectrum commonly used to by laser (light amplification by stimulated emission of radiation).

It is preferred that the laser retardant additive has laser retardant properties which are similar to those of the continuous metallic foil. In certain embodiments, the laser retardant properties may be identical to those of the continuous metallic foil. However, in other embodiments, the laser retardant properties of the additive may not be identical to those of the metallic foil but must affect the passage of the laser to some degree.

The laser retardant additive may be disposed uniformly within and/or on the second layer, disposed randomly within and/or on the second layer, or disposed in a pattern within or on the second layer. The laser retardant additive may be disposed in the second layer so as to be positioned substantially in-line with at least one, more preferably both, of the first and second scores or cuts when considered or viewed in cross section through the two layers.

The laser retardant additive may comprise an ink. Such an ink may be a metallic ink. If the laser retardant additive is a metallic ink, then it may comprise a dye mixed with metallic particles and/or flakes. The metallic particles or flakes may be evenly dispersed throughout the ink and may take the form of a suspension. It will be apparent that the accumulative effect of a number of metallic particles or flakes may result in a similar laser retardant effect to that of the metallic foil.

The ink may comprise a dye mixed with one or more of the following: metallic particles, metallic flakes, silica, ceramic materials, carbon and derivatives thereof.

Alternatively, or additionally, the second layer may comprise the, or a, layer of adhesive. The layer of adhesive may comprise a resealable or permanent adhesive or a pattern comprising areas of resealable and permanent adhesive. The layer of adhesive may comprise patterned areas of resealable and permanent adhesive and the laser retardant additive is incorporated or coated in/on the second layer in a position above or beneath the area of resealable adhesive.

The material may be scored or cut with a laser so as to produce the offset scores or cuts.

The continuous metallic foil may be bonded to or at least partially coating a plastics substrate. Likewise, the second layer may be bonded to or coating a plastics substrate. The second layer may be bonded to or coating a substantially transparent plastics substrate.

In an embodiment of the present invention, the material is used as a wrapper for wrapping consumable products. Consumable products may be a confectionery item(s), such a block chocolate. However, it will be apparent that the wrapper could be used for a wide range of products.

In a further embodiment, there is provided a method of producing a flexible laminated packaging material comprising a plurality of layers, the method comprising:

a. providing a first web of material comprising a continuous metallic film;
b. providing a second web of material incorporating or coated with a laser retardant additive which has laser retarding properties; and
c. laminating the webs together using an adhesive so as to form a laminate.

It is preferred that the laser retardant additive in the method has laser retardant properties which are similar to those of the continuous metallic foil. In certain embodiments, the laser retardant properties may be identical to those of the continuous metallic foil. However, in other embodiments, the laser retardant properties of the additive may not be identical to those of the metallic foil but must affect the passage of the laser to some degree.

The method may be used to produce a flexible laminated packaging material as herein above described. The method may further comprise the steps:

d. after lamination, applying a laser beam to the first web so as to score or cut the first web, but not the second web; and
e. applying a laser beam to the second web so as to score or cut the second web, but not the first web.

The laser beams applied to the first and second webs will preferably produce scores or cuts which are offset with respect to one another, that is to say, when the laminate is viewed in cross-section, the scores or cuts on adjacent webs are not directly in line with one another.

The laminate may be used to form a package for a number of different types of product, including block shaped products and loose products.

The laminate may be used in a number of standard packaging and wrapping techniques. Preferably, the laminate is used to form a package in a flow-wrap method.

DETAILED DESCRIPTION OF THE INVENTION

The present invention will now be more particularly described with reference to and as illustrated in the following figures:

FIG. 6 shows a plan view of a web of laminated material a fourth embodiment of the present invention;

FIG. 7 shows a cross-sectional view of the web of laminated material through the dotted line marked X-X as illustrated in FIG. 6;

Figure 1:
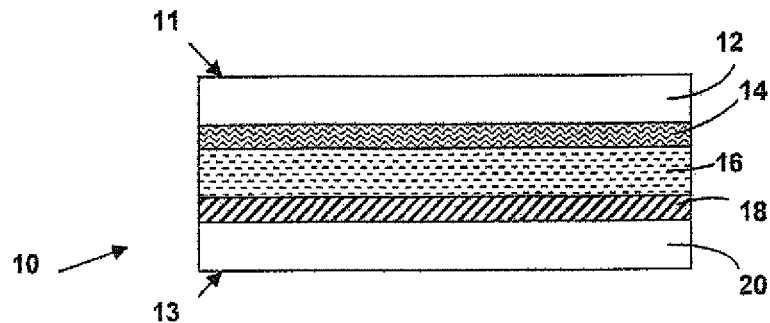
FIG. 1 shows a cross-sectional view of a prior art laminated film as commonly used for flow-wrapping products, such as chocolate bars.
Figure 2A:
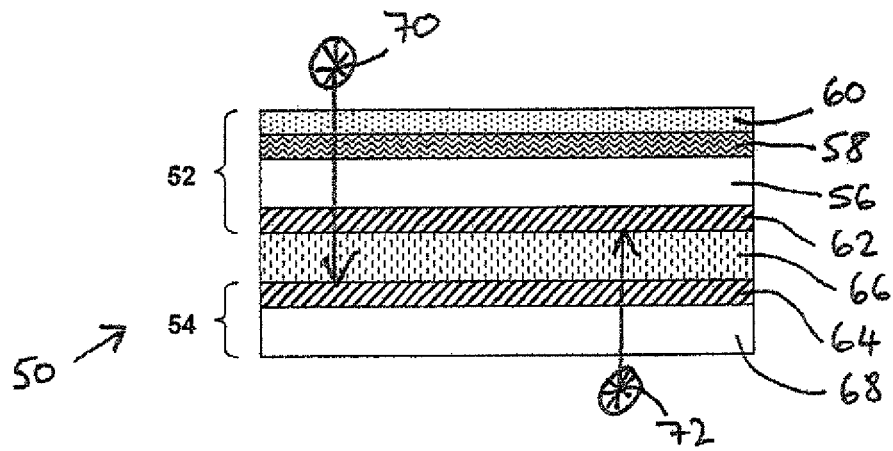
FIG. 2 shows a cross-sectional view of a second prior art laminated film as used for wrapping stacks of tissue paper or trays of biscuits.
Figure 2B:
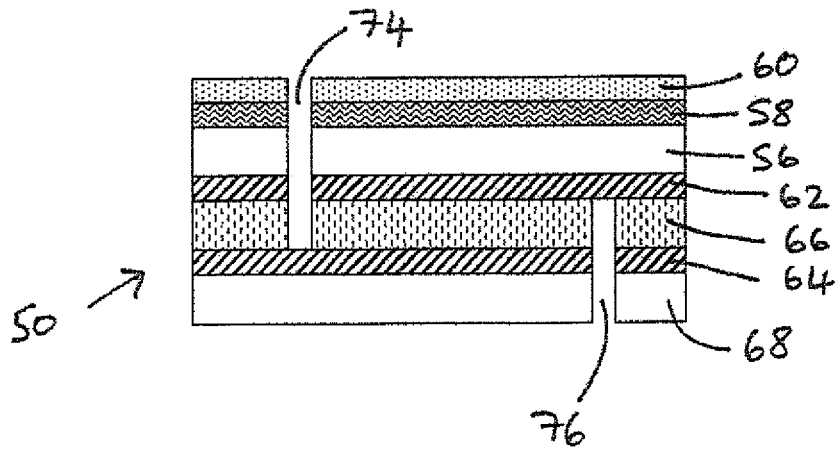
Figure 3:
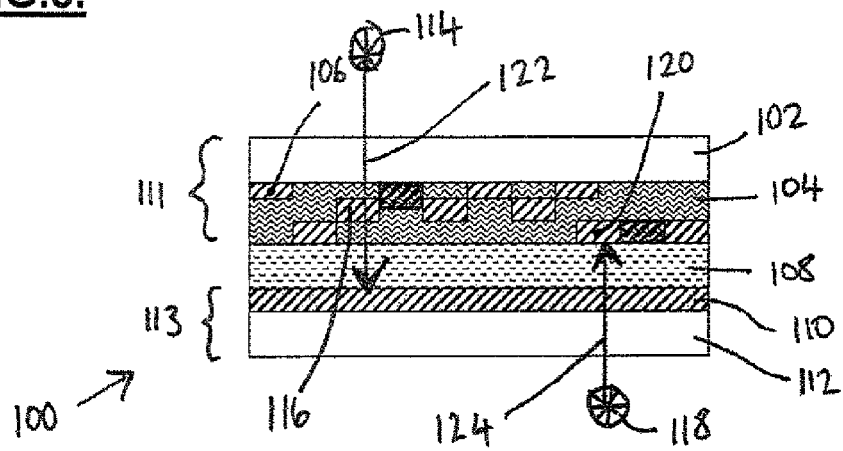
FIG. 3 shows a cross-sectional view of an embodiment of the present invention where a metallic ink has been employed as a laser retardant material.

With reference to FIG. 3, there is shown a laminated material 100 having five layers: a clear OPP layer 102; an ink layer 104 (which includes portions of metallic ink 106); an adhesive layer 108; a metallic foil layer 110; and a white OPP layer 112. The laminated material 100 is produced by bonding together the two separate webs of material by using adhesive. A first web of material 111 is formed by reverse printing the ink 104 which incorporates a number of portions having a metallic ink 106 onto the clear OPP layer 102. The second web 113 of material is formed by applying a metallic foil layer 110 to the white OPP layer 112 by means of vacuum or vapour deposition (however, the foil layer may simply be a foil which is bonded to the white OPP by means of an adhesive). The two webs 111,113 of material are then adhered to one another such that a layer of adhesive 108 binds the ink layer 104 to a position adjacent to and above the metallic foil layer 110.

A laser is used to produce offset scores or cuts in the first and second webs 111,113 of material. As can be seen in FIG. 3, the first laser 114 is able to penetrate the clear OPP layer and the ink layer 104. However, the power of the laser 114 is attenuated by a first portion of metallic ink 116 and whilst the path of the laser still continues to some degree through the adhesive layer 108, it is unable to penetrate the metallic foil layer 110. The second web 113 of material can be cut by the second laser 118 which is able to penetrate the white OPP layer 112 and whilst the path of the laser is attenuated by the metallic foil layer 110, it also passes to some extent through the adhesive layer 108 until it reaches a second portion of metallic ink 120. The offset cuts (denoted 122 and 124) formed by the first and second lasers (114 and 118) do not impair the sealing characteristics of the laminated material, but allows for the first and second webs to be peeled away from one another in the area between the cuts, if the adhesive layer 108 is a peelable and/or re-sealable adhesive. The laminated material 100 can be fed through a flow-wrap machine in order to produce packaging similar to that shown in FIGS. 8 and 9 (which will be described in more detail later on).

Figure 4:
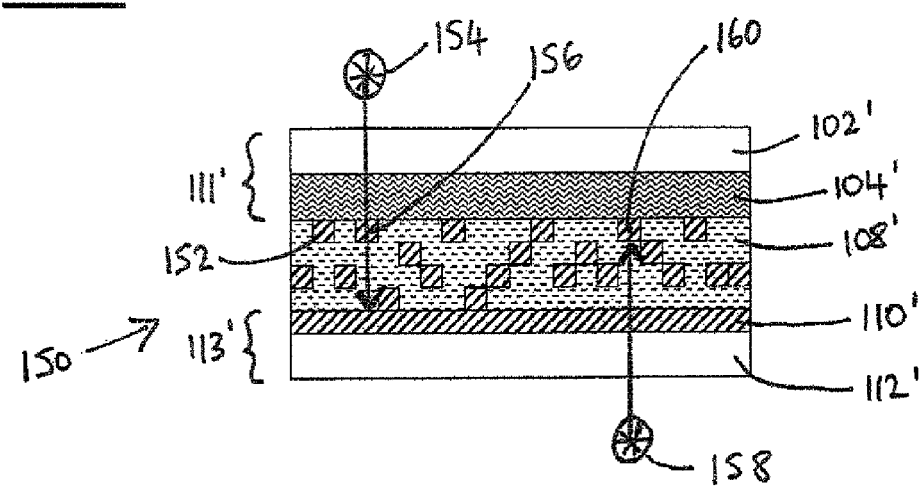
FIG. 4 shows a cross-sectional view of a second embodiment of the present invention where an adhesive layer incorporates a laser retardant material.

The embodiment as shown in FIG. 4, is formed in a similar manner as to the laminated material shown in FIG. 3. However, rather than the laminated material having an ink layer 104 having portions of metallic ink, a laser-retardant material is placed within the adhesive layer. Similar layers in FIG. 3 will be denoted with the same reference numeral prime (' ') for FIG. 4. The laminated material 150 is formed having a clear OPP layer 102', and ink layer 104', an adhesive layer 108', a metallic foil layer 110' and a white OPP layer 112'. The ink layer 114' does not contain any portions of metallic ink, but rather the adhesive layer 108 has a laser-retardant material 152 disposed therein. The laser-retardant material 152 may be any number of materials known to have laser-attenuating or retarding properties. For example, a laser-retardant material may simply be small metallic particles.

As can be seen in FIG. 4, a first laser 154 is able to penetrate the clear OPP layer 102', the ink layer 104' and whilst it passes through a laser-retardant particle 156, the laser is ultimately prevented from passing further than the metallic foil layer 110'. A second laser 158 can pass through the white OPP layer 112', and whilst it is attenuated to some degree as it passes through the metallic foil layer 110', it is ultimately prevented from passing further than through the laminated material by means of a metallic particle 160.

The metallic particles 156, 160, may be dispersed randomly or universally throughout the adhesive layer 108'. It will be apparent that if desired, using metallic particles which are uniformly dispersed throughout the adhesive layer 108' will allow for the attenuation of the laser to the same degree as to that of the metallic foil layer 110' depending on the concentration and how the metallic particles are dispersed throughout the adhesive layer. Alternatively, the metallic particles may be placed in certain locations around the area intended to be cut by the laser so as to reduce costs of producing the material.

Figure 5:
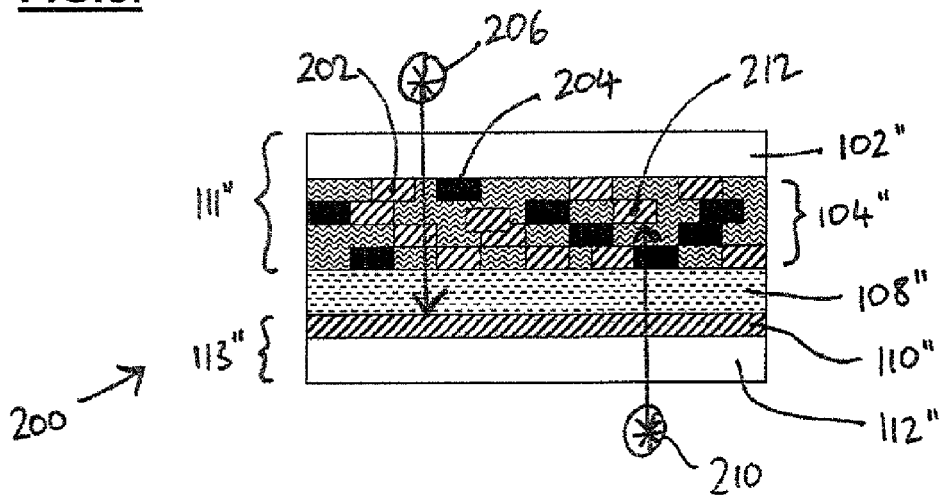
FIG. 5 shows a cross sectional view of a third embodiment of the present invention where a metallic ink has been laid onto a substrate along with non-metallic inks.

With reference to FIG. 5, there is shown a further laminated material 200 again having a similar construction as to the materials 100 and 150 shown in FIGS. 3 and 4. Similar features in the laminated material 200 to those shown in the laminated materials of FIG. 3 and FIG. 4 are denoted with same reference numeral double prime (' ''). The laminated material 200 has a plurality of layers consisting of a clear OPP layer 102", an ink layer 104", an adhesive layer 108", a metallic foil layer 110", and a white OPP layer 112". The adhesive layer 108" does not contain any metallic particles as shown in FIG. 4, but in common with FIG. 3, it has portions of metallic ink 202 located within the ink layer 104". During the print process of the ink layer onto the clear OPP layer 102", metallic ink 202 is layered on the clear OPP layer 102", along with non-metallic coloured ink 204 so as to produce the printed image seen on the outside of the laminated film. As in common with the laminated materials 100 and 150 as shown in FIG. 3 and FIG. 4, the laminated material 200 is formed of two webs 111",113" of material which are made prior to being bonded together by means of the adhesive layer 110". Also, the adhesive 108" may be a re-sealable adhesive, so that after the offset cuts have been made, the two webs can be pulled apart from one another and resealed if necessary.

In FIG. 5, a first laser 206 is shown to be able to penetrate the clear OPP layer 102", and is attenuated by a layer of metallic paint 208 and whilst the laser passes through the adhesive layer 108", the metallic layer 110" prevents further penetration. A second layer 210 penetrates the white OPP layer 112", and is attenuated by the metallic foil 110" and passes through the adhesive 108" and ultimately a metallic ink 212 prevents the laser from penetrating further through the laminated material.

FIG. 5 illustrates the feature that when applying the image to the clear OPP layer 102", a range of different inks (metallic, non-metallic and coloured) can be used so as to produce differential colour throughout the laminated material so as to provide the colours or images applied to a particular pack. The ease with which a metallic ink can be included in standard apparatus, so as to produce a laser-retardant layer, results in a laminated material which is thin and easy to produce using standard equipment, thus reducing the cost of producing the overall laminated material.

With reference to FIGS. 6 and 7, there are shown a continuous web of laminated material 300 which, after processing, is cut and run through a flow-wrap machine so as to flow-wrap a particular product, such as a chocolate bar. In common with earlier embodiments, the laminated material generally comprises an upper web 301 and a lower web 305 which are bonded together with adhesive. The continuous web 300 contains a number of "V" cut sections 302 which are areas that are processed by means of a laser prior to the material being used to wrap a given product. The "V" sections shown in FIG. 6 with a solid line correspond to laser score lines 302 for the upper web 301, whilst the dotted line corresponds to the lower score lines 303 for the lower web 305. The web of laminated material 300 is formed of five layers: a clear OPP layer 304, an ink layer 306 (which includes areas of metallic ink 308, an adhesive layer 310, a metallic foil layer 312, and a white OPP layer 314. Along either edge of the web, a permanent adhesive 316 is also provided beneath the white OPP layer 314.

Figure 9:
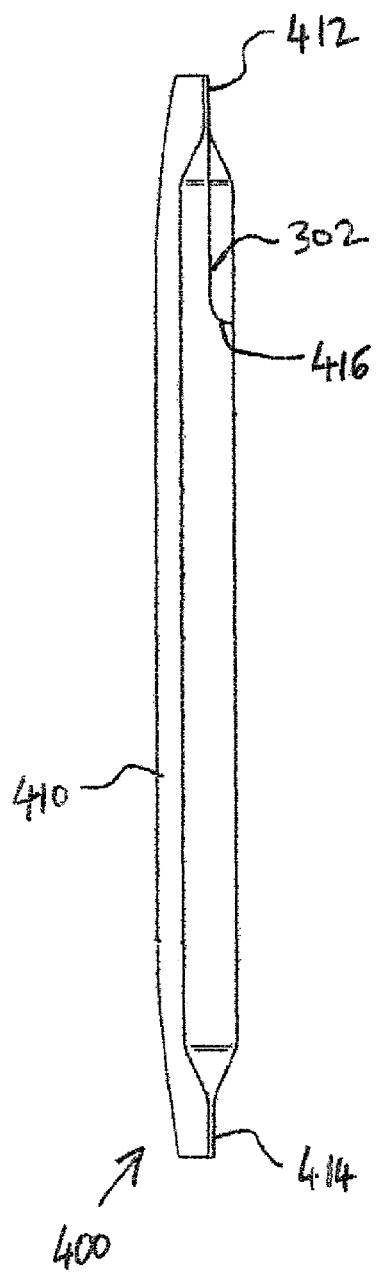
FIG. 9 shows a side view of a packaged product as illustrated in FIG. 8.

As in common with the laminated materials illustrated in FIGS. 3-5, the laminated material shown in FIGS. 6-7 is formed by reverse printing an ink layer 306 to a clear OPP layer 304. The portions of the ink layer 306 incorporating metallic ink 308 correspond to the edges of the "V" portion 302 in the web of material 300, as these are the areas which will be subjected to laser scoring. The ink layer 306 will be reverse printed onto the clear OPP layer 102 and forms a first web which is bonded to a white OPP layer 314 to which a metallic foil 312 has been applied. The two webs are adhered to one another by means of the adhesive layer 310. In order to allow the laser scored "V" to form a re-sealable flap in the packaging when formed, the laminated material is adhered with permanent adhesive 318 throughout the majority of the material 300. However, the areas between the offset cut (between the "V") will be formed with a re-sealable adhesive 330,332 so that once the offset cuts have been made, a re-sealable flap is formed within the material. The dotted lines shown in FIG. 7 illustrate the cuts which will be made by the laser and the laser beam will penetrate the material in a similar manner as described with reference to FIGS. 3-5. The addition of the permanent adhesive 316 along the edges of the material are used to bind the edges to themselves, when a product is placed centrally in the material during the packaging step so as to farm a thin seal as shown in FIG. 9. Transverse bands 322 of permanent adhesive will also form the transverse sealed edges of the package when formed.

Figure 8:
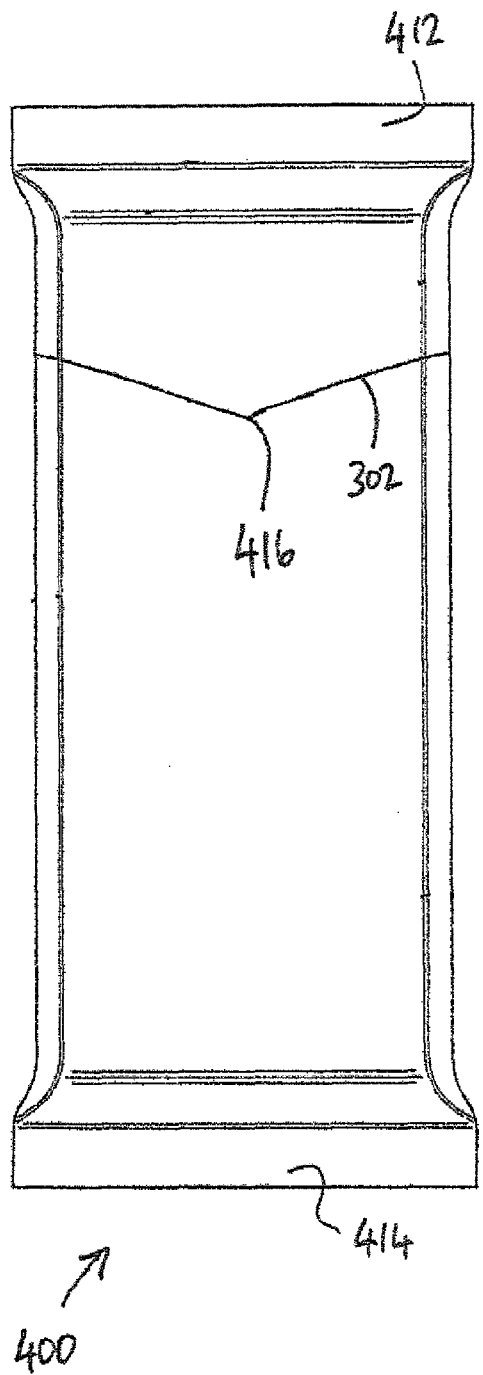
FIG. 8 shows a plan view of a packaged product made using a portion of a web of material as shown in FIG. 6.

With reference to FIGS. 8 and 9, there is shown a pack 400 which has been formed from a section 320 of the material so as to encase a chocolate bar. The web 300 is formed around the product so as to encase it and the edges are bound to one another by means of the permanent adhesive 316 so as to form the "fin" 410. Transverse lines of permanent adhesive 322 are brought together so as to form the upper and lower sealing ends for 412, 414, and thus form a sealed pack. When the product is ready to be removed from the pack, the tip 416 of the "V" shaped score line 302 is lifted. The areas of resealable adhesive 330,332 allow the upper portion of the laminated material to be removed from the lower portion of the laminated material so as to form a flap and allow entry inside the package. If the entire product has not been consumed or removed, the flap can be re-adhered to the lower portion of the material so that the flap from a re-sealable flap.

By removing the requirement to have two continuous metallic foil layers in the laminated material, the laminate can be formed much thinner and also at a reduced cost. The laminated material is also compatible with existing machinery, therefore removing the requirement to adapt or modify current flow-wrap machinery.

The foregoing embodiments are not intended to limit the scope of protection afforded by the claims, but rather to describe examples how the invention may be put into practice.

The invention claimed is:

1. A flexible laminated packaging material comprising a plurality of layers, at least of which are bonded together by a layer of adhesive, a first layer comprising a continuous metallic foil and a second layer comprising a continuous web of material incorporating or coated with a laser retardant additive having laser retarding properties, the laminated packaging material having offset scores or cuts formed by scoring or cutting the laminated packaging material with a laser, wherein a first score or cut extends through the first layer including the continuous metallic foil, but not past the second layer and a second score or cut extends through the second layer including the incorporated or coated laser retardant additive, but not past the first layer, and wherein the laser retardant additive comprises an ink.

2. The laminated packaging material as claimed in claim 1, wherein the laser retardant additive is disposed uniformly within and/or on the second layer.

3. The laminated packaging material as claimed in claim 1, wherein the laser retardant additive is disposed randomly within and/or on the second layer.

4. The laminated packaging material as claimed in claim 1, wherein the laser retardant additive is disposed in a pattern within or on the second layer.

5. The laminated packaging material as claimed in claim 1, wherein the ink comprises a metallic ink.

6. The laminated packaging material as claimed in claim 5, wherein the metallic ink comprises a dye mixed with metallic particles and/or flakes.

7. The laminated packaging material as claimed in claim 1, wherein the ink comprises a dye mixed with one or more of the following: metallic particles, metallic flakes, silica, ceramic materials, carbon, and derivatives thereof.

8. The laminated packaging material as claimed in claim 1, wherein the layer of adhesive comprises a resealable or permanent adhesive or a pattern comprising areas of resealable and permanent adhesive.

9. The laminated packaging material as claimed in claim 8, wherein the layer of adhesive comprises patterned areas of resealable and permanent adhesive, and the laser retardant additive is incorporated or coated in/on the second layer in a position above or beneath the area of resealable adhesive.

10. The laminated packaging material as claimed in claim 1, wherein the continuous metallic foil is bonded to or at least partially coating a plastics substrate.

11. The laminated packaging material as claimed in claim 1, wherein the second layer is bonded to or at least partially coating a plastics substrate.

12. The laminated packaging material as claimed in claim 10, wherein the second layer is bonded to or at least partially coating a transparent plastics substrate.

13. The laminated packaging material as claimed in claim 1, wherein the laminated packaging material is used as a wrapper for wrapping consumable products.

14. The laminated packaging material as claimed in claim 1, wherein the laser retardant additive is disposed in the second layer so as to be positioned substantially in-line with the direction of at least one of the first and second scores or cuts.

15. A method of producing a flexible laminated packaging material comprising a plurality of layers, the method comprising:
   a. providing a first web of material comprising a continuous metallic film;
   b. providing a second web of material incorporating or coated with a laser retardant additive having laser retarding properties;
   c. laminating the webs together using an adhesive so as to form a laminate;
   d. after lamination, applying a laser beam to the first web so as to score or cut through the first web including the continuous metallic film, but not the second web; and
   e. applying a laser beam to the second web so as to score or cut through the second web including the incorporated or coated laser retardant additive, but not the first web, wherein the laser beams applied to the first and second webs produce scores or cuts which are offset with respect to one another, and wherein the laser retardant additive comprises an ink.

16. The method as claimed in claim 15, wherein the laminate is used to form a package for a block shaped product.

17. The method as claimed in claim 15, wherein the laminate is used to form a package in a flow-wrap method.

* * * * *